(12) United States Patent
Seo

(10) Patent No.: US 9,703,441 B2
(45) Date of Patent: *Jul. 11, 2017

(54) TOUCH SCREEN DEVICE, TOUCH SCREEN DISPLAY DEVICE USING THE SAME, AND DRIVING METHOD THEREOF

(71) Applicant: LG Display Co., Ltd., Seoul (KR)

(72) Inventor: Seong Mo Seo, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,375

(22) Filed: Apr. 29, 2016

(65) Prior Publication Data

US 2016/0246414 A1    Aug. 25, 2016

Related U.S. Application Data

(63) Continuation of application No. 14/551,550, filed on Nov. 24, 2014, now Pat. No. 9,354,693.

(30) Foreign Application Priority Data

Dec. 31, 2013    (KR) .......................... 10-2013-0169110

(51) Int. Cl.
*G06F 3/044* (2006.01)
*G06F 1/32* (2006.01)
*G06F 3/041* (2006.01)

(52) U.S. Cl.
CPC ............ *G06F 3/044* (2013.01); *G06F 1/3262* (2013.01); *G06F 3/0412* (2013.01); *G06F 3/0416* (2013.01)

(58) Field of Classification Search
USPC ................................................ 345/174, 173
See application file for complete search history.

(56) References Cited

U.S. PATENT DOCUMENTS

2010/0085325 A1* 4/2010 King-Smith ........ G06F 3/03545
345/174
2012/0113071 A1 5/2012 Kawaguchi et al.
(Continued)

FOREIGN PATENT DOCUMENTS

CN    101689089 A    3/2010
CN    102541376 A    7/2012
(Continued)

OTHER PUBLICATIONS

Office Action for U.S. Appl. No. 14/551,550, Aug. 14, 2015, 15 Pages.
(Continued)

*Primary Examiner* — Carolyn R Edwards
*Assistant Examiner* — Deeprose Subedi
(74) *Attorney, Agent, or Firm* — Fenwick & West LLP

(57) ABSTRACT

Disclosed is a touch screen device. The touch screen device includes a touch screen panel configured to include a plurality of driving electrodes, which are disposed in parallel in a first direction, and a plurality of sensing electrodes which are disposed in parallel in a second direction, and a touch circuit unit configured to, when a touch type of a previous touch sensing period is a finger touch, sequentially apply a driving pulse to a plurality of second driving electrodes but not to a plurality of first driving electrodes among the plurality of driving electrodes, and receive a plurality of sensing signals based on the driving pulse from the plurality of sensing electrodes.

16 Claims, 8 Drawing Sheets

(56) References Cited

U.S. PATENT DOCUMENTS

| | | | |
|---|---|---|---|
| 2012/0182254 A1* | 7/2012 | Jang | G06F 3/03545 345/174 |
| 2012/0262411 A1* | 10/2012 | Ahn | G06F 3/0416 345/174 |
| 2013/0215049 A1 | 8/2013 | Lee | |
| 2013/0278560 A1* | 10/2013 | Yamaguchi | G06F 3/044 345/174 |
| 2015/0009180 A1 | 1/2015 | Simmons et al. | |

FOREIGN PATENT DOCUMENTS

| | | |
|---|---|---|
| CN | 103207718 A | 7/2013 |
| CN | 103257740 A | 8/2013 |

OTHER PUBLICATIONS

First Office Action for Chinese Patent Application No. CN 201410805058.3, Mar. 31, 2017, 17 Pages.

\* cited by examiner

TOUCH SCREEN DEVICE, TOUCH SCREEN DISPLAY DEVICE USING THE SAME, AND DRIVING METHOD THEREOF

CROSS-REFERENCE TO RELATED APPLICATIONS

This application is a continuation application of U.S. patent application Ser. No. 14/551,550, filed on Nov. 24, 2014, which claims priority from and the benefit of Korean Patent Application No. 10-2013-0169110 filed on Dec. 31, 2013, which are hereby incorporated by reference as if fully set forth herein.

BACKGROUND

Field of the Invention

The present invention relates to a touch screen panel, and more particularly, to a touch screen device and a touch screen display device using the same.

Discussion of the Related Art

A touch screen is a type of input device that is included in display devices such as liquid crystal display (LCD) devices, field emission displays (FEDs), plasma display panels (PDPs), electroluminescent displays (ELDs), and electrophoretic displays (EPDs), and enables a user to input information by directly touching a screen with a finger, a pen or the like while looking at the screen of the display device.

A touch screen is divided into a plurality of touch driving areas and a plurality of touch sensing areas, and a mutual capacitance is generated between the touch driving areas and the touch sensing areas. Therefore, whether there is a touch is determined by measuring an amount of change in a mutual capacitance based on the touch.

In a case where a touch is detected by a mutual capacitance type touch screen, since a size of a touch pattern is small formed for recognizing a touch of a pen in which a touched area is narrow. As the number of touch channels increases, a driving time and power consumption for driving the touch channels increase for detecting a finger touch and a pen touch.

SUMMARY

Accordingly, the present invention is directed to provide a touch screen device and a touch screen display device using the same that substantially obviate one or more problems due to limitations and disadvantages of the related art.

An aspect of the present invention is directed to provide a touch screen device, a touch screen display device using the same, and a driving method thereof, which perform a finger touch driving operation with low power unlike a pen touch driving operation, thereby reducing consumption power.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a touch screen device including: a touch screen panel configured to include a plurality of driving electrodes, which are disposed in parallel in a first direction, and a plurality of sensing electrodes which are disposed in parallel in a second direction; and a touch circuit unit configured to, when a touch type of a previous touch sensing period is a finger touch, sequentially apply a driving pulse to a plurality of second driving electrodes but not to a plurality of first driving electrodes among the plurality of driving electrodes, and receive a plurality of sensing signals based on the driving pulse from the plurality of sensing electrodes.

In another aspect of the present invention, there is provided a method of driving a touch screen device, including a touch circuit unit and a touch screen panel, the touch screen panel including a plurality of driving electrodes, which are disposed in parallel in a first direction and a plurality of sensing electrodes which are disposed in parallel in a second direction, the method including: when a touch type of a previous touch sensing period is a finger touch, sequentially applying a driving pulse to a plurality of second driving electrodes but not to a plurality of first driving electrodes among the plurality of driving electrodes; and receiving a plurality of sensing signals based on the driving pulse applied to the plurality of second driving electrodes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1:
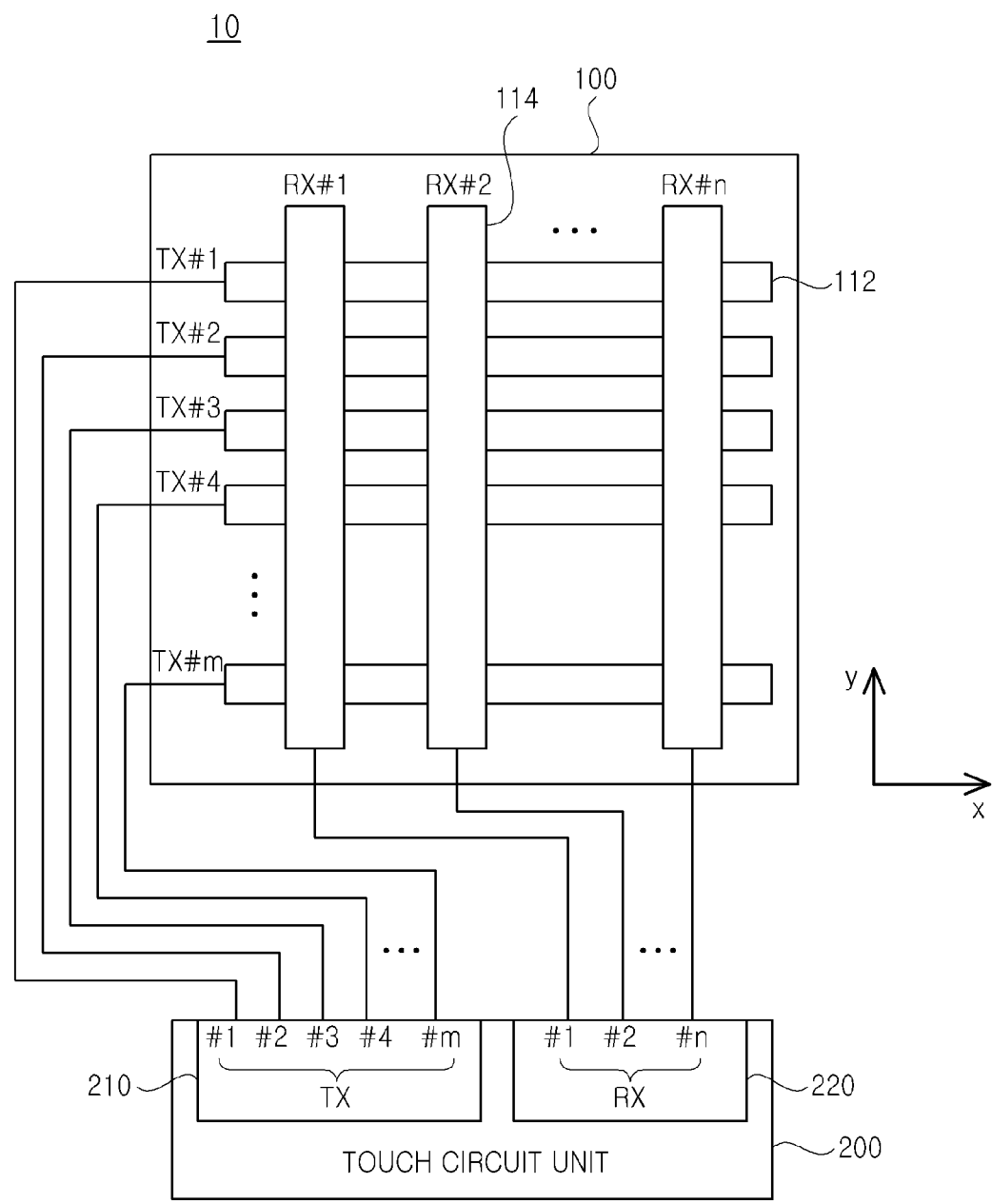
FIG. 1 is a diagram schematically illustrating an example of a configuration of a touch screen device according to embodiments of the present invention.
Figure 2:
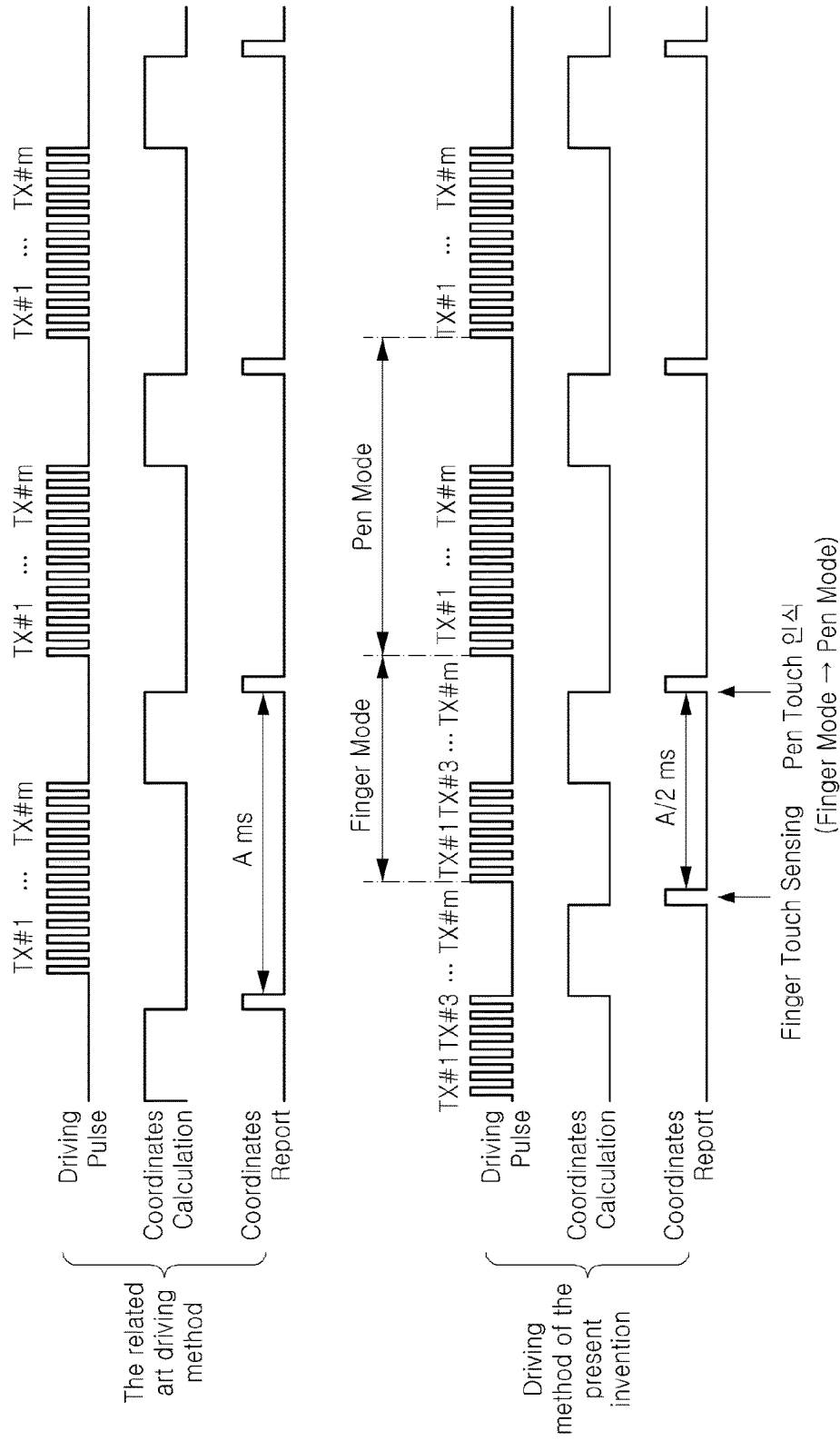
FIG. 2 is a diagram for describing a driving pulse applied to a driving electrode of FIG. 1.

FIG. 1 is a diagram schematically illustrating an example of a configuration of a touch screen device according to embodiments of the present invention, and FIG. 2 is a diagram for describing a driving pulse applied to a driving electrode of FIG. 1.

As illustrated in FIG. 1, a touch screen device 10 includes a touch screen panel 100 and a touch circuit unit 200.

The touch screen panel 100 includes a plurality of driving electrodes 112 and a plurality of sensing electrodes 114. The plurality of driving electrodes 112 are disposed in parallel in a first direction, and the plurality of sensing electrodes 114 are disposed in parallel in a second direction.

For example, as illustrated in FIG. 1, the plurality of driving electrodes 112 may be disposed in parallel in an x axis direction, and the plurality of sensing electrodes 114 may be disposed in parallel in a y axis direction.

When a touch type of a previous touch sensing period is a finger touch, the touch circuit unit 200 sequentially applies a driving pulse to a plurality of second driving electrodes but not to a plurality of first driving electrodes among the plurality of driving electrodes 112. When the touch type of the previous touch sensing period is a pen touch, the touch circuit unit 200 sequentially applies the driving pulse to all the plurality of driving electrodes 112, and receives a plurality of sensing signals, based on the applied driving pulse, from the plurality of sensing electrodes 114.

For example, as illustrated in FIG. 2, a related art driving method applies the driving pulse to all the driving electrodes without distinguishing between a finger mode in which a finger touch is sensed and a pen mode in which a pen touch is sensed. However, a driving method according to an embodiment of the present invention may apply the driving pulse to some driving electrodes (for example, odd-numbered driving electrodes) when a touch type of a previous touch sensing period is detected as the finger touch. In this case, because the driving pulse is applied to some driving electrodes instead of all the driving electrodes, a touch driving time is shortened, and thus, a touch response time (A/2 ms) according to an embodiment of the present invention is shorter than a touch response time (A ms) of the related art driving method.

Moreover, when a touch type of a previous touch sensing period is recognized as the pen touch, the pen touch is precisely sensed by applying the driving pulse to all the driving electrodes.

In other words, unlike the related art driving method that applies the same method for sensing the finger touch or the pen touch, the finger mode or the pen mode is selectively driven based on a touch type of a previous touch sensing period. In the finger mode, the driving pulse is applied to some driving electrodes, and thus, low power driving can be performed. Also, in the finger mode, a touch response time is shortened, and thus, a touch response speed can increase.

To this end, as illustrated in FIG. 1, the touch circuit unit 200 includes a driver 210 and a sensing unit 220.

When a touch type of a previous touch sensing period is the finger touch, the driver 210 may sequentially apply the driving pulse to odd-numbered driving electrodes TX#1, TX#3, . . . , and TX#m (which are second driving electrodes) but not to even-numbered driving electrodes TX#2, TX#4, . . . , and TX#m−1 (which are first driving electrodes) among a plurality of driving electrodes TX#1, TX#2, . . . , and TX#m (where m is an odd number).

Alternatively, when the touch type of the previous touch sensing period is the finger touch, the driver 210 may sequentially apply the driving pulse to the even-numbered driving electrodes TX#2, TX#4, . . . , and TX#m−1 (which are second driving electrodes) but not to the odd-numbered driving electrodes TX#1, TX#3, . . . , and TX#m (which are first driving electrodes) among the plurality of driving electrodes TX#1, TX#2, . . . , and TX#m.

Moreover, when the touch type of the previous touch sensing period is the finger touch, the driver 210 may sequentially apply the driving pulse to a plurality of second driving electrodes but not to a plurality of first driving electrodes (which are at least two electrodes) disposed between the plurality of second driving electrodes among the plurality of driving electrodes TX#1, TX#2, . . . , and TX#m.

When a touch type detected based on the driving pulse sequentially applied to the plurality of second driving electrodes is the finger touch, the driver 210 may sequentially apply the driving pulse to a plurality of first driving electrodes but not to the plurality of second driving electrodes in a next touch sensing period.

In other words, when a touch type of a current touch sensing period is the finger touch, the driver 210 may apply the driving pulse to a driving electrode (to which the driving pulse is not applied in the current touch sensing period) in a next touch sensing period, and thus, the driving electrodes may be alternately driven.

The sensing unit 220 may calculate interpolation data of a plurality of sensing signals corresponding to a plurality of first driving electrodes by using raw data of a plurality of sensing signals corresponding to a plurality of second driving electrodes. The sensing unit 220 may extract touch coordinates by using the raw data of the sensing signals corresponding to the plurality of second driving electrodes without calculating the interpolation data.

For example, interpolation data may be calculated by interpolating raw data corresponding to a plurality of second driving electrodes adjacent to a plurality of first driving electrodes.

Hereinafter, a finger mode driving method and a pen mode driving method of a touch screen device according to embodiments of the present invention will be described in detail with reference to FIGS. 3 and 4.

Figure 3:
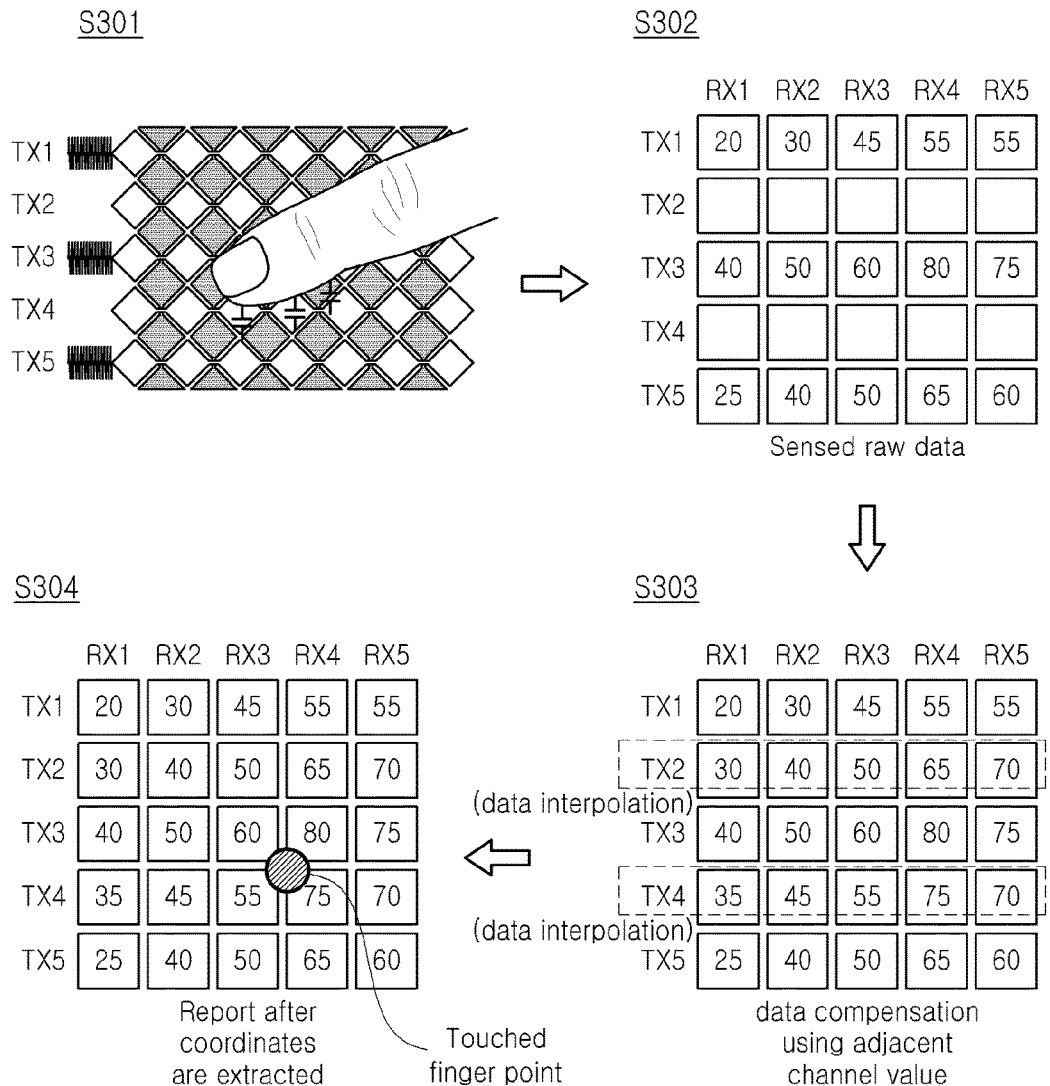
FIG. 3 is a diagram illustrating an example of a method of sensing a touch in a finger mode illustrated in FIG. 2.
Figure 4:
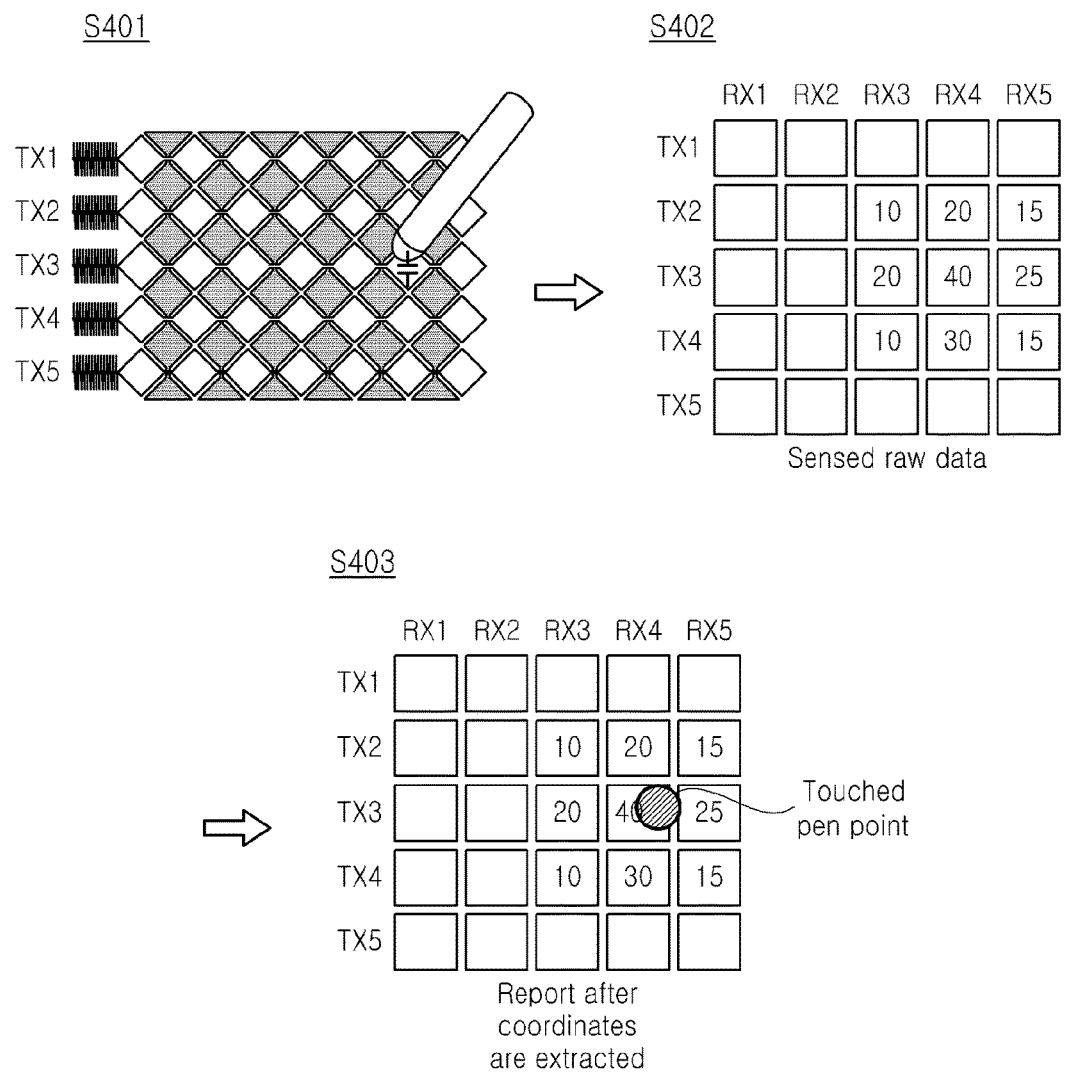
FIG. 4 is a diagram illustrating an example of a method of sensing a touch in a pen mode illustrated in FIG. 2.

FIG. 3 is a diagram illustrating an example of a method of sensing a touch in a finger mode illustrated in FIG. 2, and FIG. 4 is a diagram illustrating an example of a method of sensing a touch in a pen mode illustrated in FIG. 2.

For convenience of a description, FIGS. 3 and 4 illustrate touch electrodes having a diamond shape, but the present invention is not limited thereto. A number of touch electrodes having various shapes and sizes may be formed depending on a change of a design.

In the finger mode, as illustrated in FIG. 3, when the driving pulse is applied to odd-numbered driving electrodes TX#1, TX#3 and TX#5 (which are second driving electrodes) for sensing the finger touch in S301, raw data of sensing signals based on the driving pulse applied to the odd-numbered driving electrodes may be calculated in S302, a plurality of sensing signals corresponding to a plurality of second driving electrodes to which the driving pulse is not applied may be calculated by interpolating raw data of a plurality of sensing signals corresponding to a plurality of adjacent first driving electrodes in S303. For example, interpolation data corresponding to the plurality of second driving electrodes to which the driving pulse is not applied may be calculated by interpolating each data by using raw data of the plurality of adjacent driving electrodes. Finally, touch coordinates in the finger mode may be calculated by using raw data and interpolation data in S304. In one embodiment, touch coordinates may be extracted by using only raw data of the plurality of sensing signals corresponding to the plurality of first driving electrodes.

In the pen mode, as illustrated in FIG. 4, when the driving pulse is applied to all the driving electrodes for sensing the pen touch in S401, raw data of a pen-touched point may be calculated in S402, and touch coordinates in the pen mode may be extracted by using the calculated raw data in S403. In one embodiment, touch coordinates in the finger mode may be extracted by using interpolation data.

Therefore, the touch screen device according to embodiments of the present invention separately performs a finger touch sensing operation and a pen touch sensing operation, and does not apply the driving pulse to all the driving electrodes but applies the driving pulse to some driving electrodes. Accordingly, a load applied to the touch panel is reduced, thereby decreasing power consumption.

The above-described touch screen device 10 according to embodiments of the present invention may be coupled to various types of display panels to configure a touch screen display device.

Hereinafter, a touch screen display device according to embodiments of the present invention will be described in detail with reference to the drawing.

Figure 5:
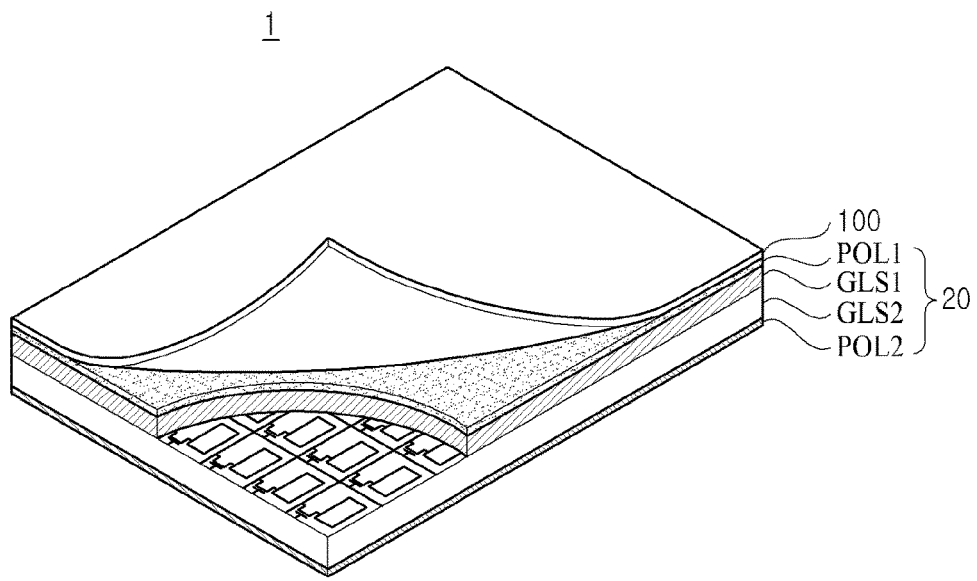
FIGS. 5 to 7 are diagrams schematically illustrating examples of a touch screen display device according to embodiments of the present invention.
Figure 6:
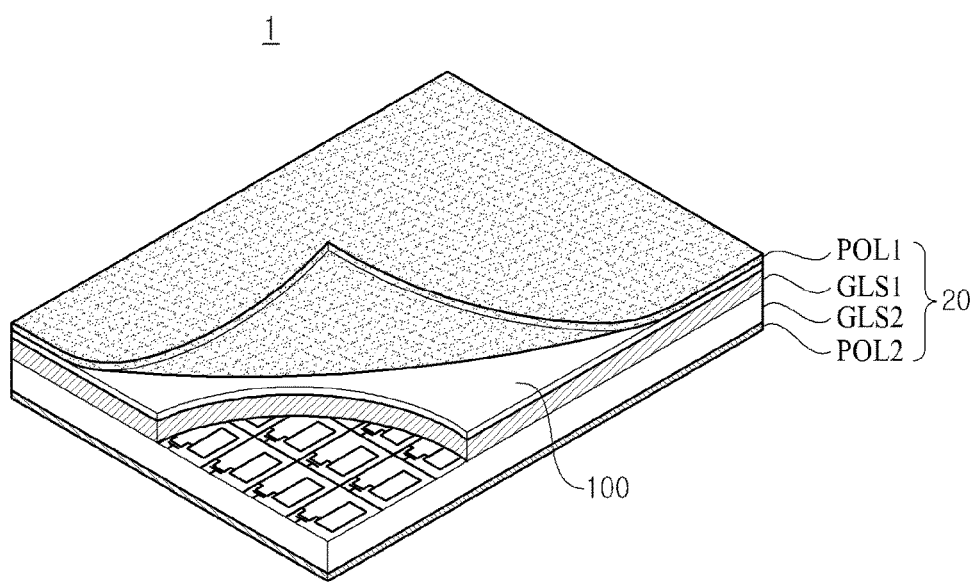
Figure 7:
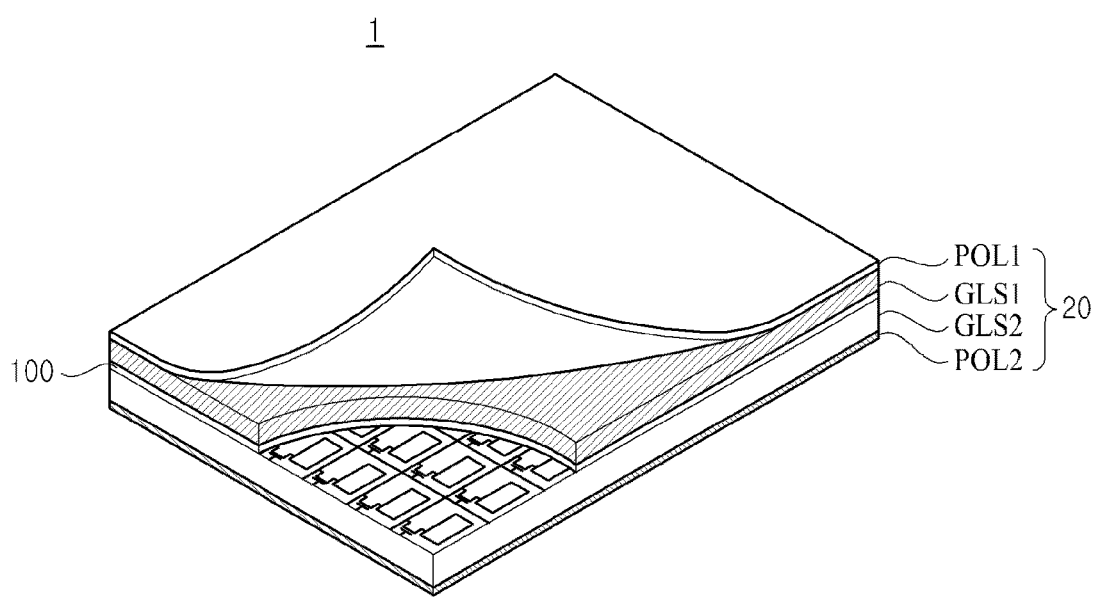

FIGS. 5 to 7 are diagrams schematically illustrating examples of a touch screen display device according to embodiments of the present invention.

A case in which a display panel 20 illustrated in FIGS. 5 to 7 is applied to an LCD device will be described as an example, but the present invention is not limited thereto. The display panel 20 may be applied to various display devices such as field emission displays (FEDs), plasma display panels (PDPs), electroluminescent displays (ELDs), and electrophoretic displays (EPDs). A general configuration of the LCD device is not described for the sake of brevity.

In a touch screen display device 1 according to embodiments of the present invention, as illustrated in FIG. 5, a touch screen panel 100 of the touch screen device 10 may be disposed on an upper polarizer POL1 of the display panel 20, or as illustrated in FIG. 6, the touch screen panel 100 of the touch screen device 10 may be disposed between the upper polarizer POL1 and an upper substrate GLS1 of the display panel 20. Alternatively, as illustrated in FIG. 7, the touch screen panel 100 of the touch screen device 10 may be built into the display panel 20. Here, GLS2 refers to a lower substrate, and POL2 refers to a lower polarizer.

At least one of a plurality of driving electrodes and a plurality of sensing electrodes included in the touch screen panel 100 of FIG. 7 may perform a function of a touch electrode and a function of a common electrode.

For example, when the plurality of driving electrodes perform the function of the touch electrode and the function of the common electrode, the plurality of sensing electrodes may perform the function of the touch electrode. For another example, when the plurality of sensing electrodes perform the function of the touch electrode and the function of the common electrode, the plurality of driving electrodes may perform the function of the touch electrode. Also, the plurality of driving electrodes and the plurality of sensing electrodes may all perform the function of the touch electrode and the function of the common electrode.

Hereinafter, a method of driving a touch screen display device according to embodiments of the present invention will be described in detail with reference to the drawing.

Figure 8:
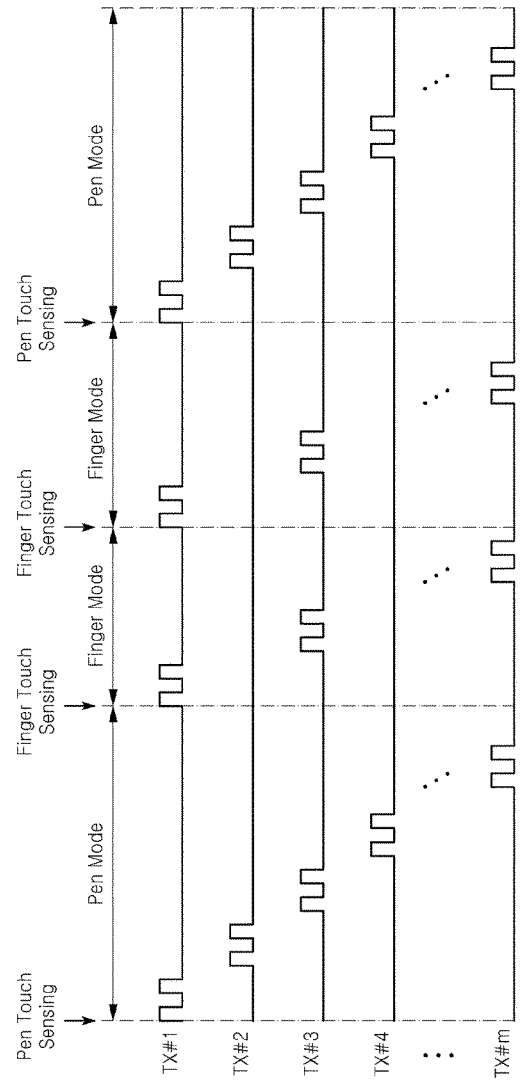
FIGS. 8 and 9 are timing diagrams showing examples of a method of driving a touch screen display device according to embodiments of the present invention.
Figure 9:
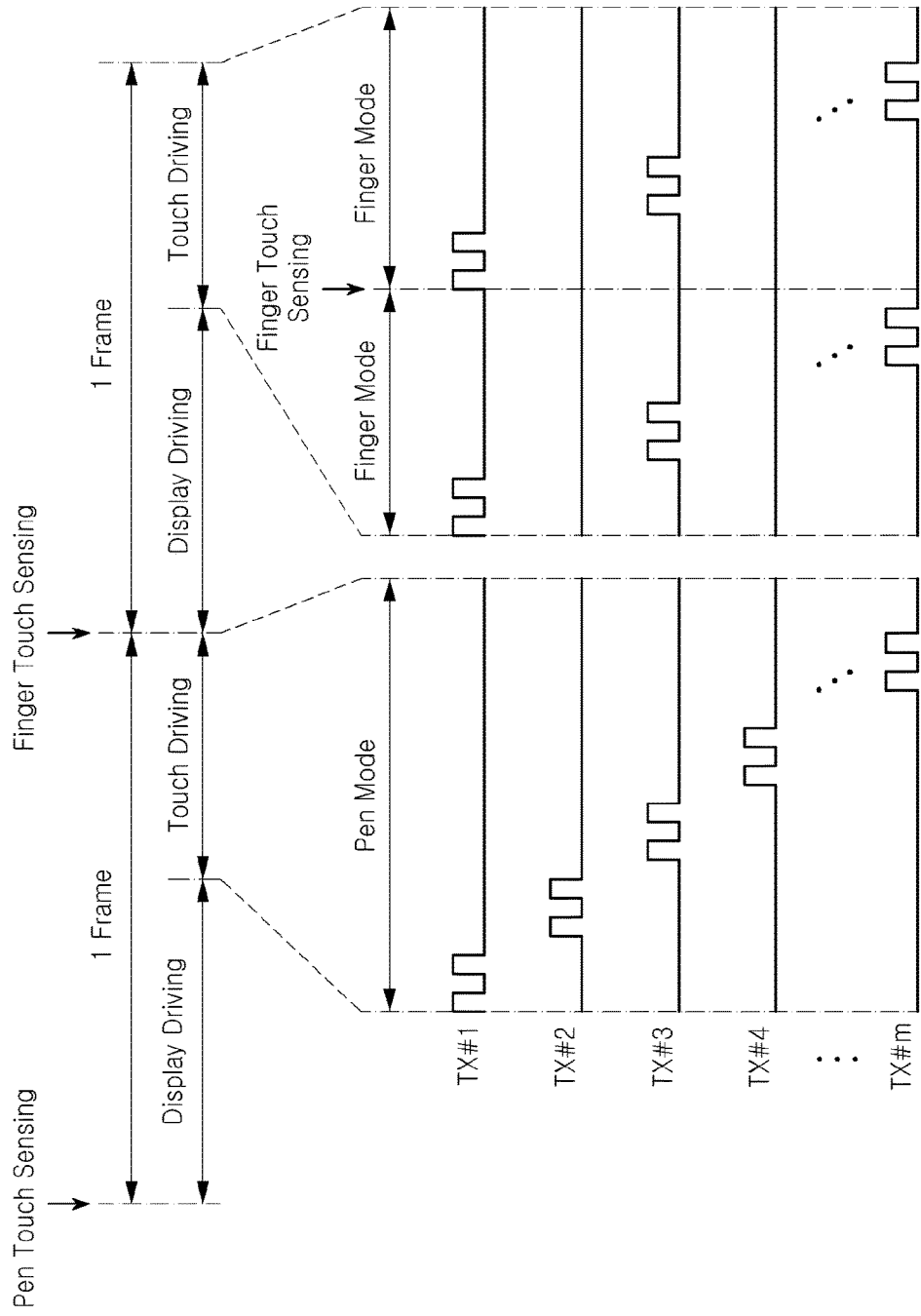

FIGS. 8 and 9 are timing diagrams showing examples of a method of driving a touch screen display device according to embodiments of the present invention.

A timing diagram of FIG. 8 may correspond to a timing diagram of the touch screen display device illustrated in FIGS. 5 and 6, and a timing diagram of FIG. 9 may correspond to a timing diagram of the touch screen display device illustrated in FIG. 7.

A touch screen display device according to the timing diagram of FIG. 8 determines whether there is a touch, separately from driving of the display panel. When a touch type of a previous touch sensing period is recognized as the pen touch, the touch screen display device operates in the pen mode where the driving pulse is sequentially applied to a plurality of driving electrodes TX#1, TX#2, . . . , and TX#m. When the touch type of the previous touch sensing period is recognized as the finger touch, the touch screen display device operates in the finger mode where the driving pulse is sequentially applied to odd-numbered driving electrodes TX#1, TX#3, . . . , and TX#m but not to even-numbered driving electrodes TX#2, TX#4, TX#m−1 among the plurality of driving electrodes TX#1, TX#2, . . . , and TX#m. Therefore, in the finger mode, a touch response time is shortened, and thus, a touch response speed can be increased.

In a touch screen display device according to the timing diagram of FIG. 9, a display panel is built into a touch screen panel, and thus, a display driving operation and a touch driving operation may be temporally divided for different frames.

In touch driving, similarly to FIG. 8, when a touch type of a previous touch sensing period is recognized as the pen touch, the touch screen display device operates in the pen mode where the driving pulse is sequentially applied to a plurality of driving electrodes TX#1, TX#2, . . . , and TX#m. When the touch type of the previous touch sensing period is recognized as the finger touch, the touch screen display device operates in the finger mode where the driving pulse is sequentially applied to odd-numbered driving electrodes TX#1, TX#3, . . . , and TX#m but not to even-numbered driving electrodes TX#2, TX#4, TX#m−1 among the plurality of driving electrodes TX#1, TX#2, . . . , and TX#m. When a touch type recognized in touch driving is the finger touch, a touch is continuously sensed in the finger mode, but when the touch type is the pen touch, a touch may be sensed in the pen mode in touch driving of a next frame. As a result, when a touch is sensed in the finger mode, the driving pulse is applied to some driving electrodes, and thus, power consumption and a touch response time are reduced. Accordingly, a touch response speed can be increased.

The timing diagram of FIG. 9 shows that each of display driving and touch driving is performed once in each frame, but the present invention is not limited thereto. In another embodiment, display driving and touch driving may be alternately performed in each frame. Also, in this case, a display driving frequency may be adjusted to 60 Hz, 120 Hz, 240 Hz, or more according to the number and time of display driving, and a touch report rate may be adjusted to 60 Hz, 100 Hz, or more according to the number and time of touch driving.

Therefore, the touch screen device according to embodiments of the present invention separately performs a finger touch sensing operation and a pen touch sensing operation, and does not apply the driving pulse to all the driving electrodes but applies the driving pulse to some driving electrodes. Accordingly, a load applied to the touch panel is reduced, thereby decreasing power consumption.

According to the embodiments of the present invention, since a finger touch sensing operation and a pen touch sensing operation are performed separately from each other, the driving pulse is not applied to all the driving electrodes but is applied to some driving electrodes, and thus, a load applied to the touch panel is reduced, thereby decreasing power consumption.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch screen device comprising:
   a touch screen panel including a plurality of touch electrodes; and
   a touch circuit unit configured to:
      during a first touch sensing period for sensing a pen touch, (i) apply a first driving pulse to the plurality of touch electrodes, and (ii) receive a first plurality of sensing signals responsive to the first driving pulse applied to the plurality of touch electrodes during the first touch sensing period, and
      during a second touch sensing period for sensing a finger touch, (i) apply a second driving pulse to a first subset of the plurality of touch electrodes but not to a second subset of the plurality of driving electrodes, and (ii) receive a second plurality of sensing signals responsive to the second driving pulse applied to the first subset of the plurality of touch electrodes but not to the second subset of the plurality of touch electrodes during the second touch sensing period,
   wherein the first touch sensing period and the second touch sensing period are not overlapping.

2. The touch screen device of claim 1, wherein the touch screen panel further includes a plurality of other touch electrodes, the plurality of touch electrodes are disposed in parallel in a first direction, the plurality of other touch electrodes are disposed in parallel in a second direction, the first plurality of sensing signals are received from the plurality of other touch electrodes, and the second plurality of sensing signals are received from the plurality of other touch electrodes.

3. The touch screen device of claim 1, wherein a touch electrode of the first subset of the plurality of touch electrodes and a touch electrode of the second subset of the plurality of touch electrodes are alternately disposed in the touch screen panel in a second direction.

4. The touch screen device of claim 1, wherein at least two of the second subset of the plurality of touch electrodes are disposed between adjacent ones of the first subset of the plurality of touch electrodes.

5. The touch screen device of claim 1, wherein at least two of the first subset of the plurality of touch electrodes are disposed between adjacent ones of the second subset of the plurality of touch electrodes.

6. The touch screen device of claim 1, wherein the touch circuit unit is further configured to, during a third touch sensing period for sensing the finger touch, apply a third driving pulse to the second subset of the plurality of touch electrodes but not to the first subset of the plurality of touch electrodes.

7. The touch screen device of claim 1, wherein the touch circuit unit is further configured to calculate interpolation data of a plurality of sensing signals corresponding to the second subset of the plurality of touch electrodes by using raw data of a plurality of sensing signals corresponding to the first subset of the plurality of touch electrodes.

8. The touch screen device of claim 7, wherein the interpolation data is calculated by interpolating the raw data corresponding to the first subset of the plurality of touch electrodes which are respectively adjacent to the second subset of the plurality of touch electrodes.

9. A touch screen display device comprising:
   the touch screen device of claim 1; and
   a display panel disposed on the touch screen panel of the touch screen device.

10. A touch screen display device comprising:
    the touch screen device of claim 1; and
    a display panel into which the touch screen panel of the touch screen device is built,
    wherein at least one of the plurality of touch electrodes performs a function of a touch electrode and a function of a common electrode.

11. A method of driving a touch screen device, including a touch circuit unit and a touch screen panel, the touch screen panel including a plurality of touch electrodes, the method comprising:
    during a first touch sensing period for sensing a pen touch, (i) applying a first driving pulse to the plurality of touch electrodes, and (ii) receiving a first plurality of sensing signals responsive to the first driving pulse applied to the plurality of touch electrodes during the first touch sensing period; and
    during a second touch sensing period for sensing a finger touch, (i) applying a second driving pulse to a first subset of the plurality of touch electrodes but not to a second subset of the plurality of touch electrodes, and (ii) receiving a second plurality of sensing signals responsive to the second driving pulse applied to the first subset of the plurality of touch electrodes but not to the second subset of the plurality of touch electrodes during the second touch sensing period,
    wherein the first touch sensing period and the second touch sensing period are not overlapping.

12. The method of claim 11, wherein the touch screen panel further includes a plurality of other touch electrodes, the plurality of touch electrodes are disposed in parallel in a first direction, the plurality of other touch electrodes are disposed in parallel in a second direction, the first plurality of sensing signals are received from the plurality of other touch electrodes, and the second plurality of sensing signals are received from the plurality of other touch electrodes.

13. The method of claim 11, further comprising:
    during a third touch sensing period for sensing the finger touch, applying a third driving pulse to the second subset of the plurality of touch electrodes but not to the first subset of the plurality of touch electrodes.

14. The method of claim 11, further comprising:
    calculating interpolation data of a plurality of sensing signals corresponding to the second subset of the plurality of touch electrodes by using raw data of a plurality of sensing signals corresponding to the first subset of the plurality of touch electrodes.

15. The method of claim 14, wherein the interpolation data is calculated by interpolating the raw data corresponding to the first subset of the plurality of touch electrodes which are respectively adjacent to the second subset of the plurality of touch electrodes.

16. The touch screen device of claim 1, wherein the first driving pulse is a same signal as the second driving pulse.

* * * * *